US012146826B2

(12) United States Patent
Dionne et al.

(10) Patent No.: US 12,146,826 B2
(45) Date of Patent: Nov. 19, 2024

(54) METASURFACE DEVICE FOR DETECTING OPTICAL CHIRALITY

(71) Applicant: The Board of Trustees of the Leland Stanford Junior University, Stanford, CA (US)

(72) Inventors: Jennifer A. Dionne, Menlo Park, CA (US); Jack Hu, Stanford, CA (US); Michelle Solomon, Cotuit, MA (US); Mark Lawrence, Saint Louis, MO (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 113 days.

(21) Appl. No.: 17/769,849

(22) PCT Filed: Nov. 8, 2020

(86) PCT No.: PCT/US2020/059586
§ 371 (c)(1),
(2) Date: Apr. 18, 2022

(87) PCT Pub. No.: WO2021/092526
PCT Pub. Date: May 14, 2021

(65) Prior Publication Data
US 2022/0364982 A1  Nov. 17, 2022

Related U.S. Application Data

(60) Provisional application No. 62/932,959, filed on Nov. 8, 2019.

(51) Int. Cl.
*G01N 21/21* (2006.01)

(52) U.S. Cl.
CPC ....... *G01N 21/21* (2013.01); *G01N 2021/216* (2013.01)

(58) Field of Classification Search
CPC ............... G01N 21/21; G01N 2021/216; B01J 2531/0261; B01J 31/00; B01J 2531/00;
(Continued)

(56) References Cited

U.S. PATENT DOCUMENTS 9,007,575 B2   4/2015   Chou
10,054,839 B1  8/2018   Brener
(Continued)

FOREIGN PATENT DOCUMENTS

WO   WO2008002981   1/2008

OTHER PUBLICATIONS

Hu et al., High Quality Factor Dielectric Metasurfaces for Ultraviolet Circular Dichroism Spectroscopy, ACS Photonics 2020, 7, 1, 36-42.

*Primary Examiner* — Dominic J Bologna
*Assistant Examiner* — Carlos Perez-Guzman
(74) *Attorney, Agent, or Firm* — LUMEN PATENT FIRM

(57) ABSTRACT

A device for detecting optical chirality includes a metasurface composed of a biperiodic array of nanodisks in the form of a checkerboard array [300], where the nanodisks have diameters $d \pm \Delta/2$ such that adjacent nanodisks [302, 304] have diameters that differ by an offset $\Delta$. The nanodisks are composed of a dielectric material that is transparent and has a refractive index greater than 2 at a predetermined operational ultraviolet wavelength. The nanodisks have a width-to-height aspect ratio d/h tuned to produce spectral overlap of electric dipole and magnetic dipole modes of incident circularly polarized ultraviolet light.

7 Claims, 10 Drawing Sheets

(58) Field of Classification Search
CPC . C08G 2261/214; G02F 1/353; G02F 1/3526; G02F 1/3556; G02F 1/37; G02F 2203/15
See application file for complete search history.

(56) References Cited

U.S. PATENT DOCUMENTS

| | | | |
|---|---|---|---|
| 2010/0231911 A1* | 9/2010 | Fischer | G01J 4/02 |
| | | | 356/246 |
| 2014/0034820 A1 | 2/2014 | Fattal | |
| 2014/0374621 A1* | 12/2014 | Chou | B82Y 30/00 |
| | | | 250/453.11 |
| 2017/0003169 A1 | 1/2017 | Shaltout | |
| 2019/0049788 A1* | 2/2019 | Kuznetsov | G09G 3/36 |
| 2022/0011646 A1* | 1/2022 | Semmlinger | G02F 1/37 |

* cited by examiner

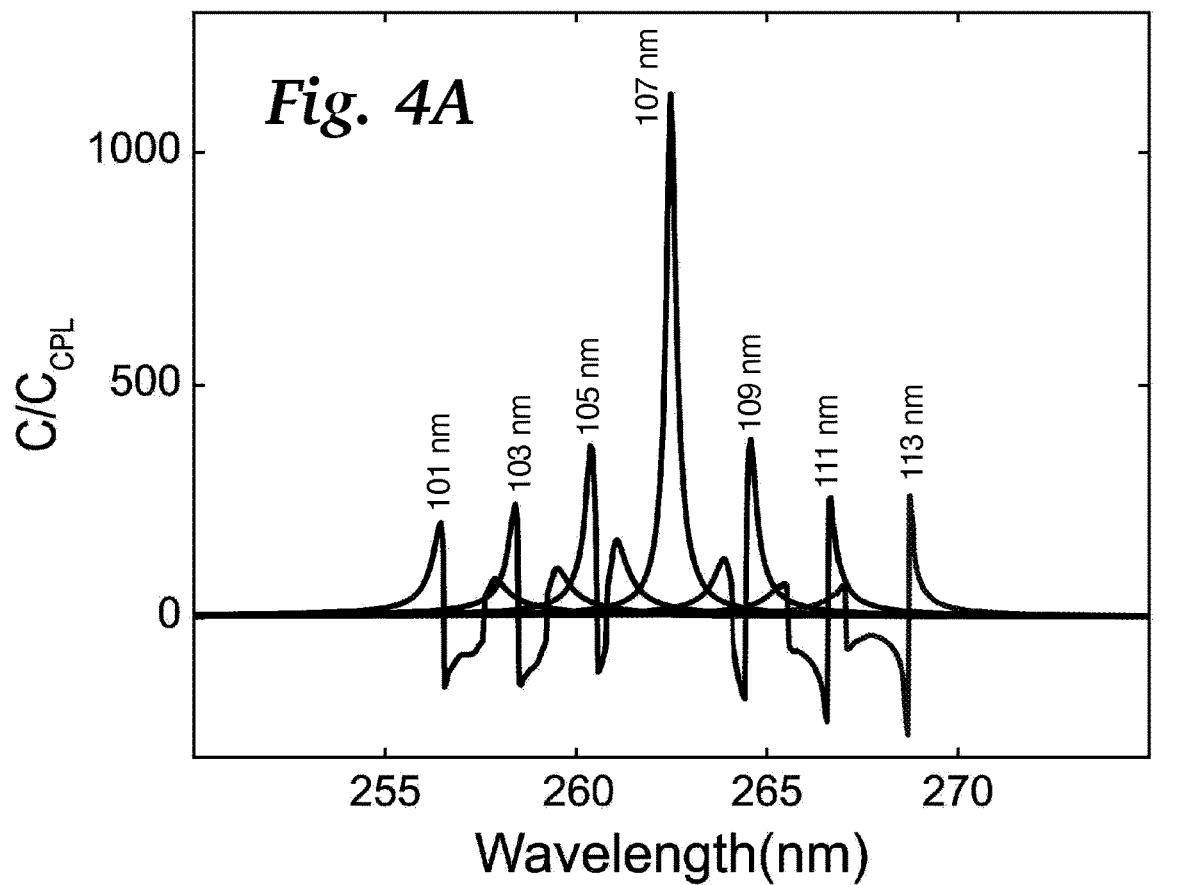
*Fig. 4A*
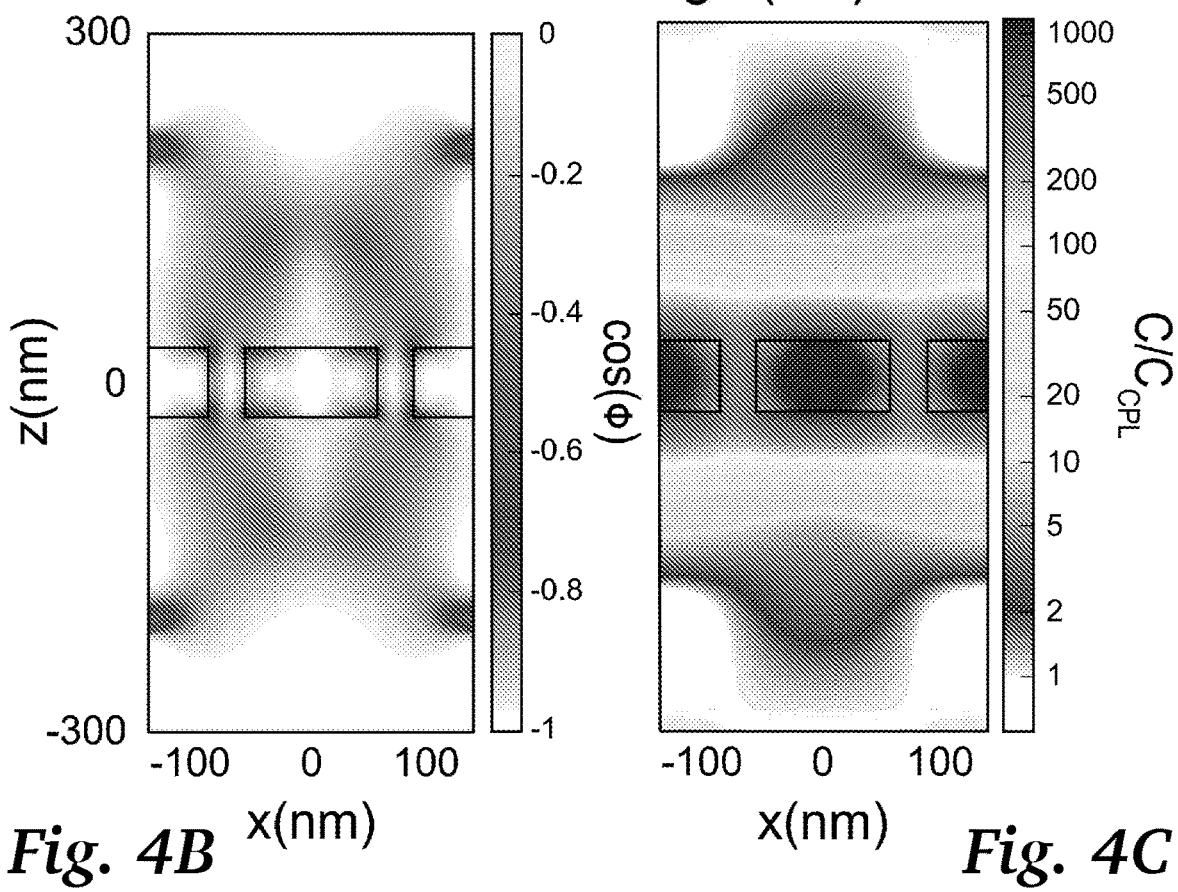
*Fig. 4B*  *Fig. 4C*

METASURFACE DEVICE FOR DETECTING OPTICAL CHIRALITY

FIELD OF THE INVENTION

The present invention relates generally to optical devices. More specifically, it relates to metasurface optical devices.

BACKGROUND OF THE INVENTION

Over 50% of pharmaceuticals and 40% of agrochemicals are chiral (that is, 'handed') molecules. The handedness of the molecules can have distinct interactions with biological life. For example, one enantiomer of Prozac acts as an antidepressant while the other induces cardiac arrhythmia and one Ethambutol enantiomer treats tuberculosis while the other causes blindness. Most pharmaceuticals and agrochemicals are synthesized without any enantiospecificity (that is, both handed molecules are created during the synthesis.) Accordingly, separating enantiomers and determining the enantiopurity of a solution is of paramount importance for biochemical, pharmaceutical, and agrochemical industries.

Chiral-optical spectroscopies, such as circular dichroism, are critical in the biomedical, pharmaceutical, and agrochemical industries for revealing structural information about molecules and determining the purity of chemical samples.

Existing separation techniques, such as chiral column chromatography, are costly and time intensive, requiring a new chiral stationary phase for each new drug or agrochemical target. For this reason, most agrochemicals are sold as mixtures, with potentially deleterious impact on the environment. Similarly, the number of new pharmaceuticals brought to market is only a fraction of the available drugs, due to the difficulty in separating enantiomers.

Finally, current detection methods are not sensitive enough to accurately quantify trace amounts of chiral molecules in a solution—critical for determining the enantiopurity of a solution. High sensitivity detection of opposite-handed molecules could also enable early disease detection, since protein misfoldings underlie many diseases (including Alzheimer's, Parkinson's, and kidney disease) and a sensitive liquid biopsy of blood, urine, mucus or spit could reveal trace amounts of 'right-handed' (D) amino acids.

Emerging nanophotonic platforms have been shown to increase the intrinsically weak interaction between circularly polarized light and chiral molecules through the concentration of the local density of optical chirality, C. However, enhancements in C have been limited to infrared and visible frequencies, while the chiral absorption features of most small molecules are in the ultraviolet. Furthermore, achievable C enhancements in nanophotonic systems remain relatively low, especially when averaged across the sample volume.

SUMMARY OF THE INVENTION

In one aspect, the present invention provides a chiral device composed of high-refractive index nanoparticles to form a metasurface. The device may be used for chiral detection by illuminating it with circularly polarized light (i.e., from a laser or LED). Ideal circularly polarized light has a normalized Jones vector $[1, i]/\sqrt{2}$—i.e., the components of the electric field in two orthogonal transverse directions are equal in magnitude and 90 degrees out of phase. This approach does not depend critically on having ideally circularly polarized light, although it is preferred for incident light to be as close to ideal circular polarization as possible. Thus we regard incident light as being sufficiently 'circularly polarized' if the two magnitudes in the normalized Jones vector differ by 0.1 or less and the two phases in the normalized Jones vector differ by 90±10 degrees.

The high refractive index nanoparticles are designed to have electric and magnetic optical (Mie) resonances at ultraviolet frequencies. The particular frequency can be tailored by the material and nanostructure dimensions to match the resonant frequency of a particular molecule or drug. Therefore, this approach removes the laborious and costly design of chiral stationary phase molecules with a simple ensemble optical spectra of the drug or agrochemical, and then utilization of the appropriate size or material nanoparticle or metasurface. The metasurface utilizes wide band gap materials, such as diamond and $TiO_2$, to move the enhancements into the ultraviolet, to overlap with the optical absorption features of most pharmaceuticals and agrochemicals, as well as most amino acids. High-quality factor resonances in the metasurface create large local electromagnetic fields for very efficient separation and sensitive detection. The device can also be applicable in cases where a set of nanoparticles on a surface provides a suitable chiral resonance, even though the nanoparticles, strictly speaking, may not be a metasurface. For example, the nanoparticles could be arranged in a 1D chain forming a waveguide device or as individual particles or small sets of a few particles that still exhibit chiral resonances.

A primary application use of the device is in separation of racemic mixtures of molecules with high enantiomeric excess and yield. This is useful to create high enantiomeric excess pharmaceuticals and agrochemicals such as salbutamol, naproxen, ibuprofen, ephedrine, fiptonil, and citalopram to name a few. This approach is also useful for enhancing the signal from circular dichroism spectroscopy, which is essential in quantifying enantiomeric excess and detecting trace concentrations of biomolecules. Therefore, this approach could also be used as a new liquid biopsy for early disease detection based on the presence of opposite-handed, D amino acids.

The device uses an optical metasurface that engineers the interaction of light with chiral molecules. This approach is much more versatile than chemical methods for chiral molecule resolution that require a unique molecular substrate (the stationary phase) depending on the target chemical species. Therefore, the device significantly reduces costs since the optical metasurface can be rationally and quickly designed to process a wide variety of target molecules. Additionally, most previous photonic platforms and sensors are optimized for visible wavelengths, far from the ultraviolet electronic resonances of the molecules of interest. This is largely due to the lack of materials with UV resonances, as well as inability to generate high enough electric and magnetic fields with these materials as they generally have lower refractive indices or higher optical losses. This device uses materials that are resonant in the ultraviolet, tailoring high quality factor resonances to overcome the lower refractive indices. Furthermore, this approach is naturally achiral, which means that it can provide a background-free platform for sensing chiral molecules. This is important because the circular dichroism signal from molecules is vanishingly small when any background signal is present.

In one aspect, the invention provides a device for detecting optical chirality, the device comprising a metasurface composed of a biperiodic array of nanodisks. The biperiodic array is a checkerboard array, where the nanodisks have diameters d±Δ/2 such that adjacent nanodisks have diameters that differ by an offset, Δ. The nanodisks are composed of a dielectric material that is transparent and has a refractive index greater than 2 at a predetermined operational ultraviolet wavelength. The nanodisks have a width-to-height ratio tuned to produce spectral overlap of electric dipole and magnetic dipole modes of incident circularly polarized ultraviolet light.

In some embodiments, an asymmetry parameter α=Δ/d is substantially 0.1 or less. In some embodiments, the dielectric material has a bandgap larger than 3 eV. In some embodiments, the dielectric material is diamond, titanium dioxide, aluminum nitride, hafnium oxide, boron nitride, zirconium dioxide, or silicon nitride. In some embodiments, a height of the nanodisks is 50-200 nm. In some embodiments, a spacing between adjacent nanodisks is 100-400 nm. In some embodiments, the width-to-height aspect ratio of the nanodisks is 0.3-3.0.

BRIEF DESCRIPTION OF THE DRAWINGS

FIG. 4A is a graph showing the maximum local optical chirality for high Q disk metasurfaces, according to an embodiment of the invention.

FIG. 4B shows the spatial distribution of the phase between E and H, $\cos(\phi)$, for a metasurface, according to an embodiment of the invention.

FIG. 4C is a plot of the logarithmic scaled distribution of C for a metasurface, according to an embodiment of the invention.

DETAILED DESCRIPTION

Figure 1:
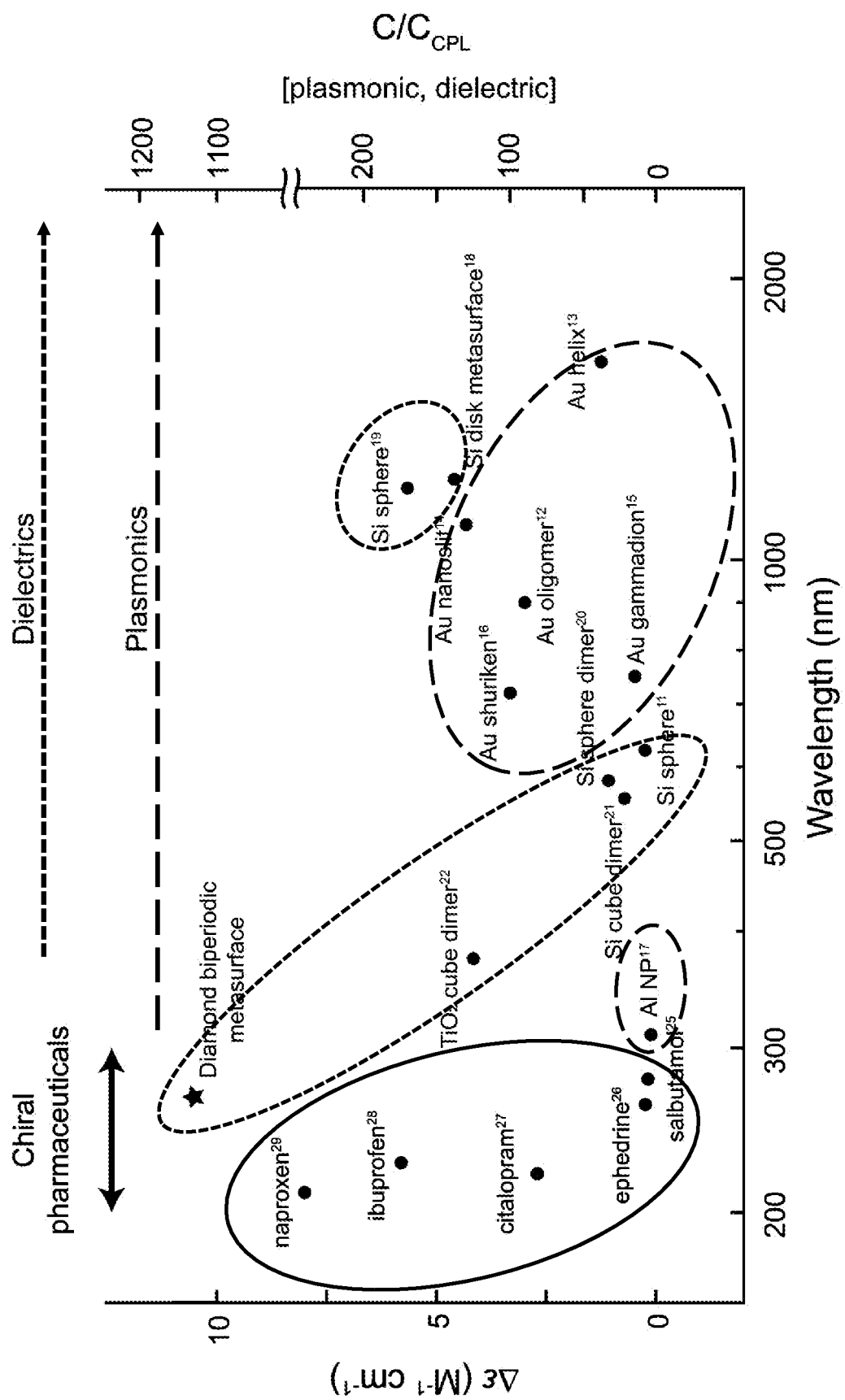
FIG. 1 is a graph showing the optical chirality enhancements in plasmonic and dielectric nanophotonic devices compared with differential RCP/LCP absorption, Δε, of small molecule pharmaceuticals.

In a preferred embodiment of the invention, a high quality factor (high Q) diamond metasurface enhances C by over 3 orders of magnitude in the ultraviolet regime compared to existing materials. The diamond nanostructures enable ultraviolet Mie resonances while a biperiodic disk lattice activates high Q resonances that significantly increase the electromagnetic field intensities. When a high Q electric dipole and magnetic dipole mode are spatially and spectrally overlapped, a Kerker-like condition emerges that enables uniform sign C enhancements that are locally as high as 1130-fold. Even when averaged across the unit cell and 40 nm away from the surface, enhancements in C exceed 100-fold. We show how the quality factor and C can be further tuned by adjusting the structural asymmetry via the diameter offset in the biperiodic lattice. Our results pave the way for ultrasensitive chiral spectroscopy and efficient light-mediated enantiomer separation.

Chirality is a physical descriptor for a pair of objects that are mirror images of each other, but not superimposable. In living matter, molecular chirality significantly dictates the function of many biomolecules, including proteins, amino acids, enzymes, and hormones. For example, physiologically active amino acids appear as L-enantiomers while trace amounts of D-amino acids can mark the onset of organ failure or neurodegenerative diseases. Synthetic chemicals such as pharmaceuticals and agrochemicals can also exhibit chirality, with opposite enantiomers having distinct interactions with biological life.

The enantiospecific interactions between chiral molecules and chiral light offers a versatile method to detect and distinguish enantiomers. This phenomena is utilized in circular dichroism (CD) spectroscopy, where the differential absorption of an enantiomer illuminated with right- and left-circularly polarized (RCP/LCP) light is measured. CD spectroscopy can both determine the secondary structure of chiral molecules and the purity of a chiral solution. However, the chiroptical response of most small molecules is intrinsically weak, necessitating high analyte concentrations and long integration times.

Recent developments in novel nanophotonic materials have produced platforms with favorable properties for highly sensitive chiral molecule detection. These metamaterials are generally designed to provide large local concentrations of optical chirality, C, defined as $$C=-(\omega/2c^2)Im(E^*\cdot H)=-(\omega/2c^2)|E||H|\cos(\phi_{iE,H}),$$

where E and H represent the complex electric and magnetic fields, $\omega$ is the angular frequency of light, and c is the speed of light in a vacuum. $\phi_{iE,H}$ describes the phase angle between iE and H where $\cos(\phi_{iE,H})=\pm 1$ for circularly polarized light (CPL) in vacuum. The differential absorption of RCP and LCP by an enantiomer, $\Delta\epsilon$, is proportional to the local C. Thus, designing platforms that concentrate electromagnetic fields while creating or maintaining circular polarized states provides a means to increase the chiroptical response of molecules.

In the past, both plasmonic resonances in metallic structures and Mie resonances in high-refractive-index dielectric materials have been engineered for this purpose. Calculated enhancements in C upwards of 150-fold greater than that of CPL have been demonstrated for metallic helices, gammadions, shurikens, and twisted nanoparticle assemblies, as well as dielectric spheres, cubes, and disks. Using these systems, augmented chiral detection has been experimentally achieved on large molecules with chiroptical bands at visible and infrared (IR) frequencies. However, most industrially relevant small molecules are in the ultraviolet (UV) regime, as illustrated in FIG. 1. While certain plasmonic and quantum dot systems can enhance non-resonant tails or induce CD signals at visible frequencies, molecular information is convoluted in the overall system response.

FIG. 1 is a graph showing the optical chirality enhancements in plasmonic and dielectric nanophotonic platforms compared with differential RCP/LCP absorption, $\Delta\epsilon$, of small molecule pharmaceuticals. The graph also shows a device according to one embodiment of the invention, marked with a star. Note: C enhancements for these nanostructures were calculated for specific design parameters and wavelengths, but many designs feature enhancements that can be tuned via geometrical parameters across the visible and IR spectrum.

To improve the performance of chiral sensing platforms, embodiments of the present invention provide novel metamaterials with resonances overlapping the chiral molecular absorption features in the UV regime. Enhancing C in the UV may be accomplished with materials with low losses, as absorption by the nanostructures dampens resonant enhancements and induces a background signal in CD measurements. Although UV transparent dielectrics could be utilized with previous nanophotonic designs, these systems are inherently limited by low quality factor resonances that only weakly concentrate electromagnetic fields. This challenge is further exacerbated by the lower refractive indices of UV materials. Furthermore, many chiral sensors produce nonuniform chiral fields or rely on field confinement in tight gaps, where the chiroptical response of molecules is only enhanced in certain locations on the nanostructures.

In one embodiment of the invention, high quality factor (high Q) diamond metasurfaces for enhanced CD in mid-ultraviolet frequencies are provided. The use of diamond enables UV Mie resonances while our high Q design increases the electromagnetic field intensities and optical chirality densities by orders of magnitude. Other suitable materials are titanium dioxide, aluminum nitride, hafnium oxide, boron nitride, zirconium dioxide, or silicon nitride. More generally, the material may be a dielectric material that is transparent and has a refractive index greater than 2 at a predetermined operational ultraviolet wavelength.

The metasurface is composed of a biperiodic disk lattice where the asymmetry in adjacent disks allows for free-space coupling into high Q resonances. The tuning of asymmetric electric and magnetic dipole modes enhances the optical chirality density over three orders of magnitude locally. Importantly, optical chirality enhancements are of a single handedness and still exceed two orders of magnitude averaged across a plane 40 nm away from the metasurface. This global enhancement of C is a desired property for CD spectroscopy measurements where small molecules will be randomly distributed around the nanostructures. Furthermore, altering the degree of asymmetry in the disk lattice controls the resonant Q factors and allows for C enhancements spanning multiple orders of magnitude.

To enhance the electromagnetic density of chirality, C, a preferred embodiment uses a diamond disk metasurface. Diamond was chosen as the studied material system due to its relatively high refractive index (n~2.6) and negligible losses down to $\lambda$~240 nm. Furthermore, advances in fabrication techniques have produced high-quality nanoscale diamond structures. The dielectric disk metasurface has nanoantennas (i.e., nanodisks) that support both electric and magnetic Mie resonances that can be independently tuned in relation to each other via the disk aspect ratio.

Figure 2A:
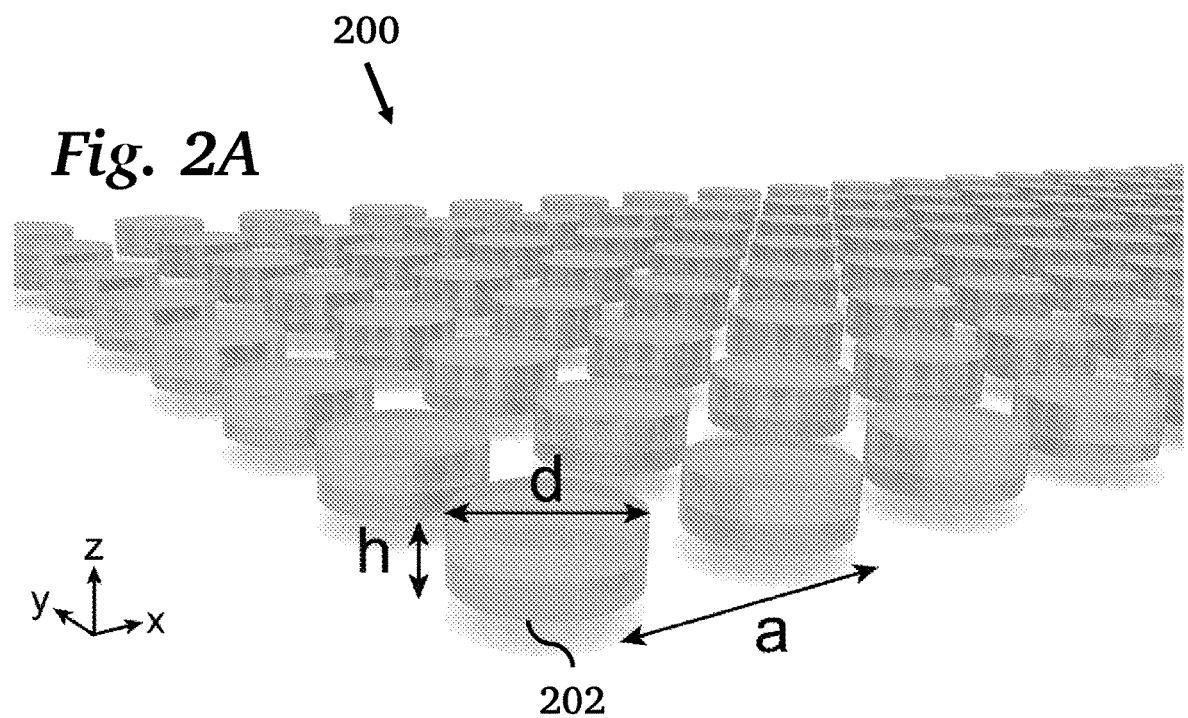
FIG. 2A is a schematic perspective view of a metasurface composed of an array of nanodisks, according to an embodiment of the invention.

In a preferred embodiment, the metasurface is composed of an array 200 of nanodisks, as shown in FIG. 2A. In one implementation, each nanodisk 202 has dimensions of height h=60 nm, lattice parameter $\alpha$=200 nm, and diameters (i.e., widths) ranging from d=132 nm to d=156 nm. The incident light is an LCP plane wave propagating in the −z direction.

Using full-field finite difference time domain simulations, we first calculate the total fields from a square array of disks illuminated with CPL at normal incidence. The dielectric structures are calculated with the optical properties of diamond including loss, and are embedded in a background refractive index of n=1.

Figure 2B:
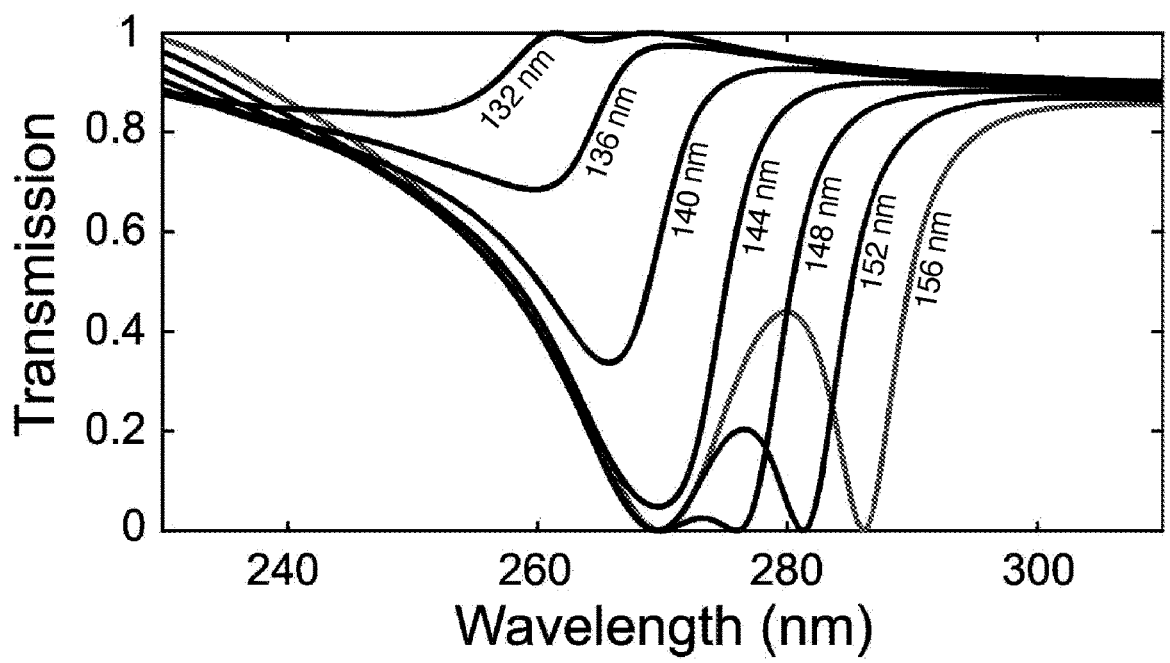
FIG. 2B is a graph showing transmission spectra of a diamond metasurface, according to an embodiment of the invention.
Figure 2C:
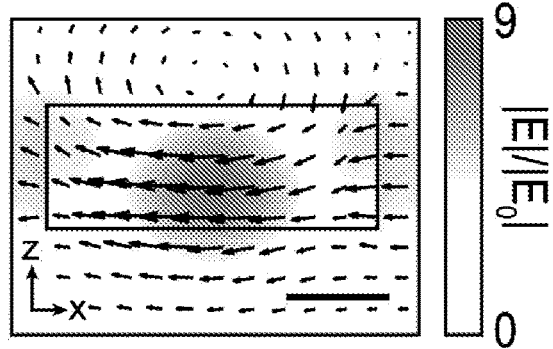
FIG. 2C and FIG. 2D show the electric field distributions for electric and magnetic dipolar modes, respectively, of a nanodisk in a metasurface device, according to an embodiment of the invention.
Figure 2D:
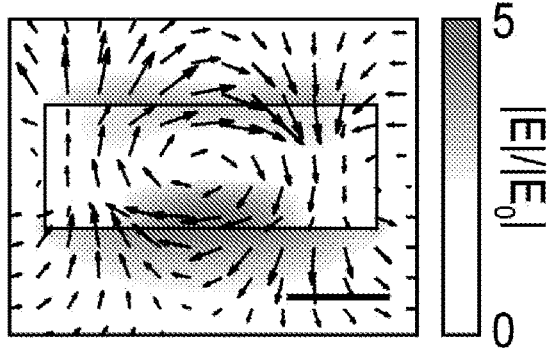

FIG. 2B is a graph showing transmission spectra of a diamond metasurface illuminated by CPL with disk height h=60 nm, lattice constant $\alpha$=200 nm, and varying disk diameter d=132 nm to d=156 nm. The curve corresponding to diameter d=156 nm has two resonance dips at $\lambda$=286 nm and $\lambda$=270 nm. These two modes are an electric dipole p and magnetic dipole m. FIG. 2C and FIG. 2D show the electric field distributions for these electric and magnetic dipolar modes, respectively. Scale bars are 50 nm.

When the disk aspect ratio (d/h) is tuned by altering the diameter, p and m shift frequencies in relation to each other. At an aspect ratio of d/h=2.2 (d=132 nm) the dipolar modes are spectrally overlapped and exhibit a Kerker condition where the transmission approaches unity. When the metasurface is operating at the Kerker condition, the scattered fields from the structure preserve the helicity of the incident CPL, a property that is ideally suited for enhancing optical chirality.

Figure 2E:
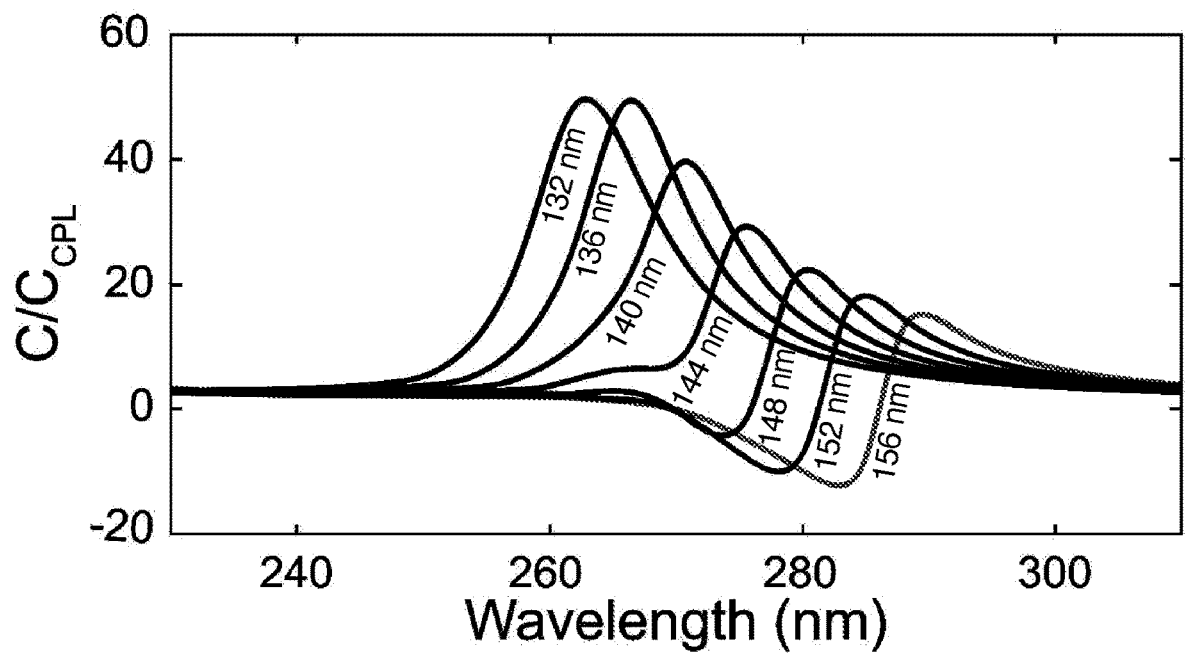
FIG. 2E is a graph of the spectra of C enhancements for metasurfaces with varying disk diameters, according to an embodiment of the invention.

FIG. 2E is a graph of the spectra of C enhancements for metasurfaces with varying disk diameters, showing maximum local enhancement of C external to the diamond structures as the disk aspect ratio is tuned to d/h=2.2 (d=132 nm). At this aspect ratio, the maximum local optical chirality enhancement outside of the disks is 49-fold greater than that of CPL.

Figure 2F:
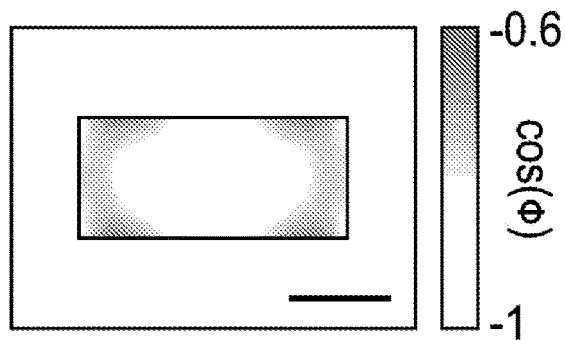
FIG. 2F and FIG. 2G show the spatial distributions of the phase lag $\cos(\phi_{iE,H})$ and optical chirality enhancements, plotted for a metasurface, according to an embodiment of the invention.
Figure 2G:
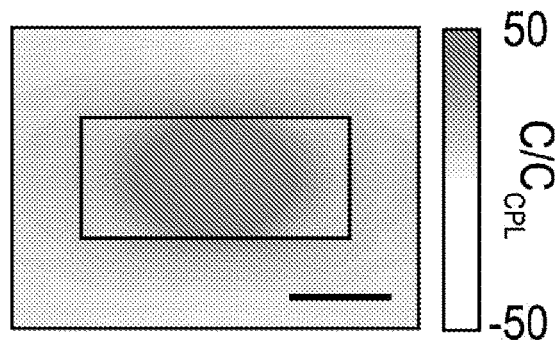

FIG. 2F and FIG. 2G show the spatial distributions of the phase lag $\cos(\phi_{iE,H})$ and optical chirality enhancements, plotted for a metasurface with d/h=2.2 (d=132 nm) and incident wavelength λ=263 nm. The spatial distribution of $\cos(\phi)$ indicates that the E and H scattered fields have a π/2 phase shift and maintain the incident circular polarization. The circularly polarized near fields in combination with the resonant E and H concentrations produce strong C enhancements in the disk that extend into the surrounding medium. The C enhancements around the metasurface are of the same handedness which is beneficial for experimental CD measurements where it is difficult to localize molecules at specific locations around the nanostructures.

Figure 2H:
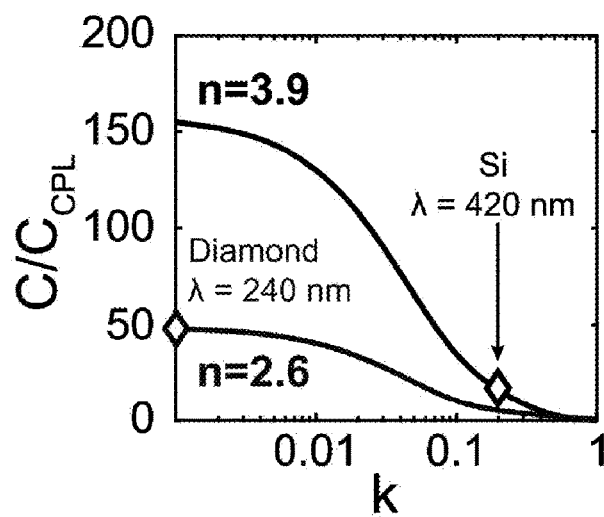
FIG. 2H is a graph showing maximum local optical chirality enhancements as a function of the imaginary part of the refractive index, k, for representative silicon (n=3.9) and diamond (n=2.6) metasurfaces, according to an embodiment of the invention.

While spectral overlap of p and m modes is an effective strategy for increasing C, these enhancements can be limited by the optical properties of the dielectric material. For comparison, we optimize two sets of disk metasurfaces with fixed refractive indices of n=3.9 (representative of silicon in the visible) and n=2.6 (representative of diamond in the UV). The disk aspect ratios for these two sets are d/h=2.35 for silicon and d/h=2.2 for diamond. The maximum local optical chirality is then calculated as the imaginary component of the refractive index, k, is increased. FIG. 2H is a graph showing maximum local optical chirality enhancements as a function of the imaginary part of the refractive index, k, for representative silicon (n=3.9) and diamond (n=2.6) metasurfaces.

Figure 2I:
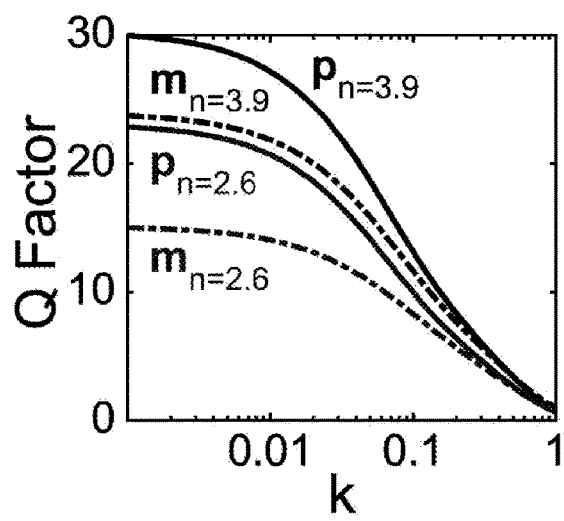
FIG. 2I is a graph showing quality factors of the electric and magnetic dipole resonances in silicon and diamond, according to an embodiment of the invention.

FIG. 2I is a graph showing quality factors of the electric and magnetic dipole resonances in silicon and diamond. The quality factor of both p and m is calculated from the linewidths of the electric field intensity $|E|^2$ and magnetic field intensity $|H|^2$ at the center of the disks, respectively. The Q factor of the resonances correlates with the field intensities produced around the nanostructures and consequently the highest attainable C enhancements.

FIG. 2H and FIG. 2I indicate that higher refractive index materials can produce a significantly larger enhancement in C, but that material absorption quickly dampens the resonances and diminishes the chiral fields. At wavelengths longer than λ=1100 nm silicon is lossless and exhibits a maximum C enhancement of 150-fold. However, as the imaginary part of the silicon refractive index increases, C rapidly decreases until there is no significant enhancement below ~400 nm. Diamond metasurfaces can only achieve a maximum C increase of 49 times, but are lossless until ~240 nm. These insights suggest that designing a metasurface with higher Q modes in a lossless material would allow for even greater optical chirality increases in the W.

Figure 3A:
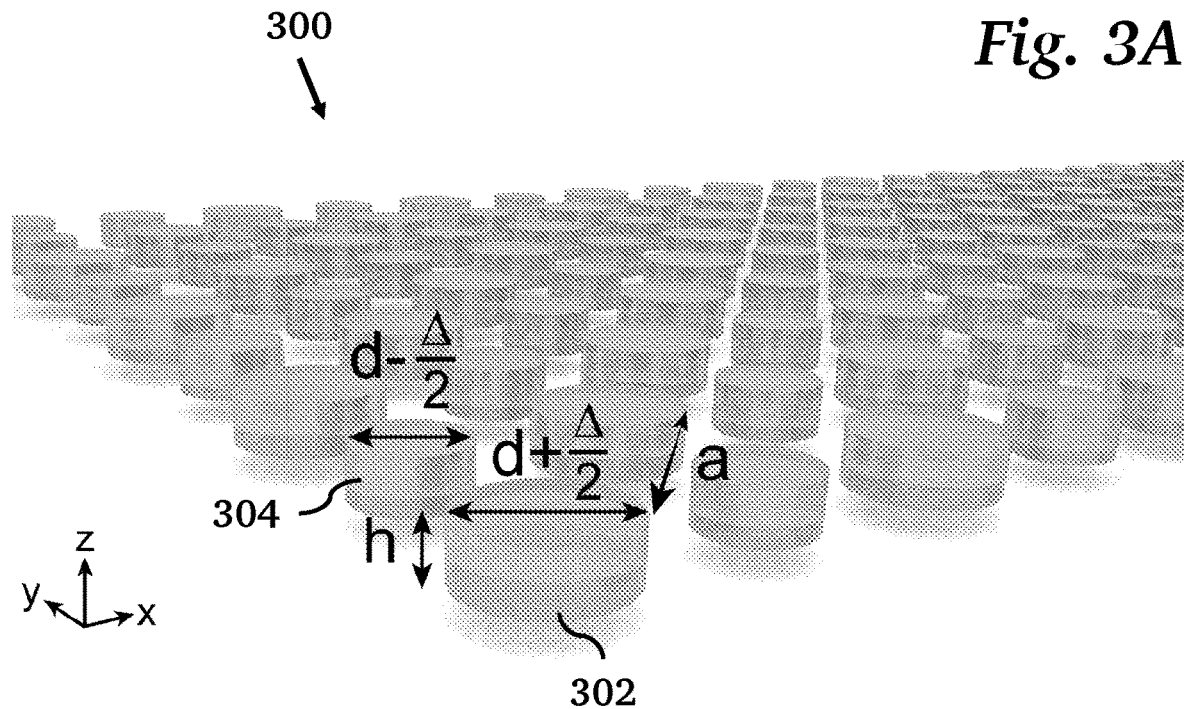
FIG. 3A is a schematic perspective view of a biperiodic metasurface array where adjacent nanodisk diameters alternate between two diameters, according to an embodiment of the invention.

In order to increase the quality factors of our resonant modes, and consequently the local field concentrations, we utilize dark modes, coupling into them from the far field via asymmetries in the disk array. Thus, in a preferred embodiment, shown in FIG. 3A, the device has a biperiodic metasurface array 300 where adjacent dielectric nanodisks 302, 304 have diameters d+Δ/2 and d−Δ/2 arranged in a square checkerboard lattice, i.e., each row and column of the array has disks whose diameters alternate between d+Δ/2 and d−Δ/2, where d is the mean diameter. We describe the geometric difference between adjacent disks through the asymmetry parameter, α:

$$\alpha = \Delta/d.$$

Figure 3B:
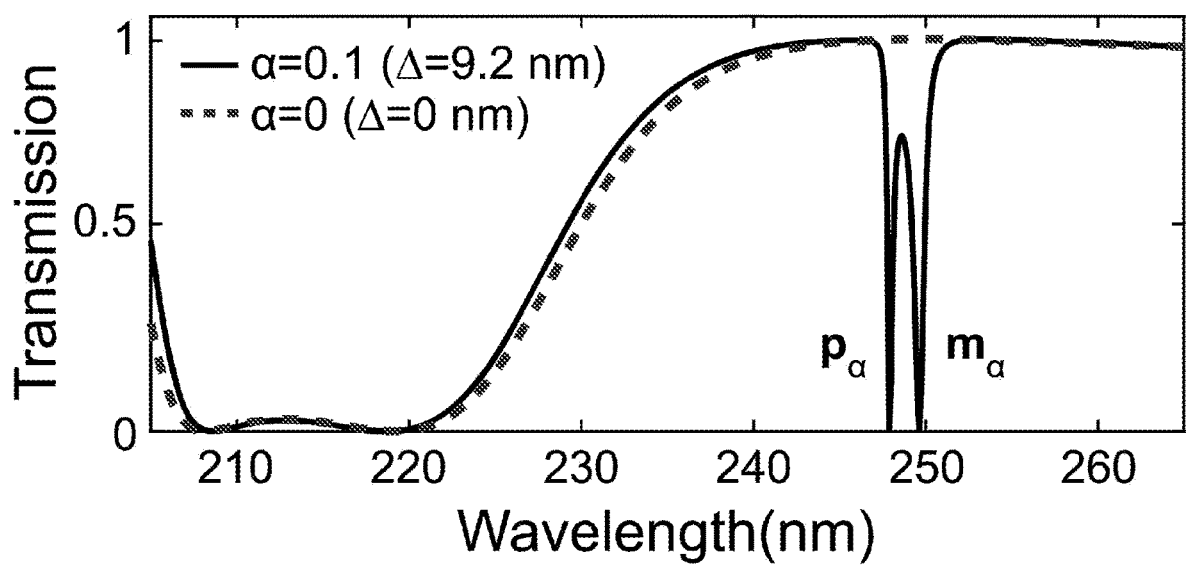
FIG. 3B is a graph showing the transmission spectra of symmetric (α=0) and asymmetric (α=0.1) diamond disk metasurfaces, according to an embodiment of the invention.
Figure 3C:
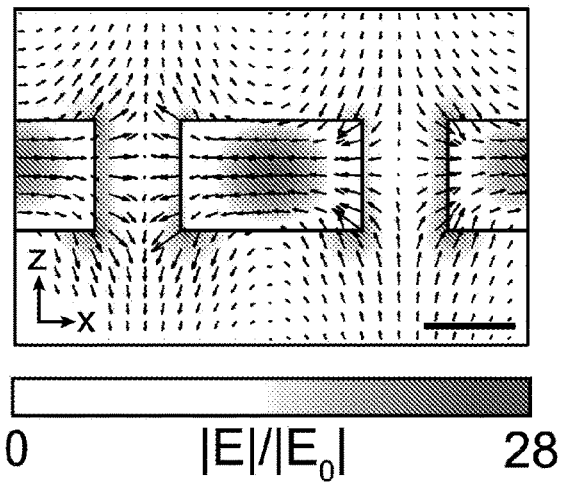
FIG. 3C and FIG. 3D illustrate the electric field distributions for asymmetric electric and magnetic dipolar modes, respectively, according to an embodiment of the invention.
Figure 3D:
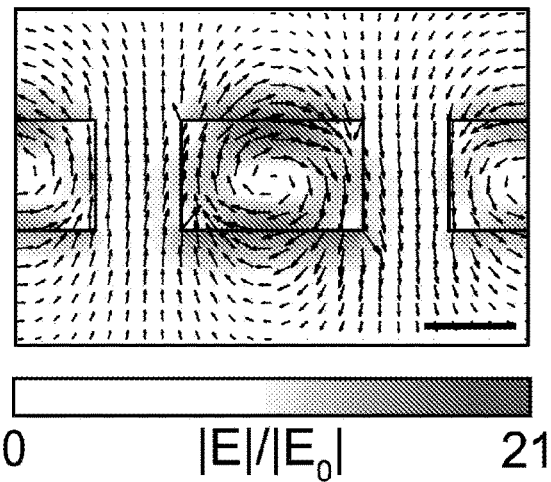

FIG. 3B is a graph showing the transmission spectra of symmetric (α=0) and asymmetric (α=0.1) diamond disk metasurfaces. The metasurfaces have dimensions α=200 nm, h=60 nm, and d=92 nm. The two broad dips around 210 nm and 220 nm correspond to the normal p and m modes seen previously in metasurfaces where the disk diameters are all equal. When we introduce a disk asymmetry to form a biperiodic lattice, two sharp resonance features appear in the transmission spectra. These high Q resonances are also dipole-like. FIG. 3C and FIG. 3D illustrate the electric field distributions for these asymmetric electric and magnetic dipolar modes, respectively. Scale bars are 50 nm. One of these modes has electric character ($p_\alpha$) while the other is magnetic ($m_\alpha$). However, dipoles in neighboring disks are oscillating out of phase. The asymmetry suppresses the interaction of the resonances with free space, leading to longer resonance lifetimes and higher quality factors. When the diameters of the disk are offset by 10% (α=0.1), the Q factors of $p_\alpha$ and $m_\alpha$ are ~1000 and ~500, respectively. The extended resonant lifetimes produce large field enhancements within the disks, $|E|/|E_0|$~30 and $|H|/|H_0|$~65. We chose α=0.1 where Δ~10 nm, as these dimensions are on the order of achievable features with state of the art diamond fabrication techniques. However, the geometric asymmetry between neighboring disks can be tuned to further increase the Q factor of these resonances (vide infra).

Figure 3E:
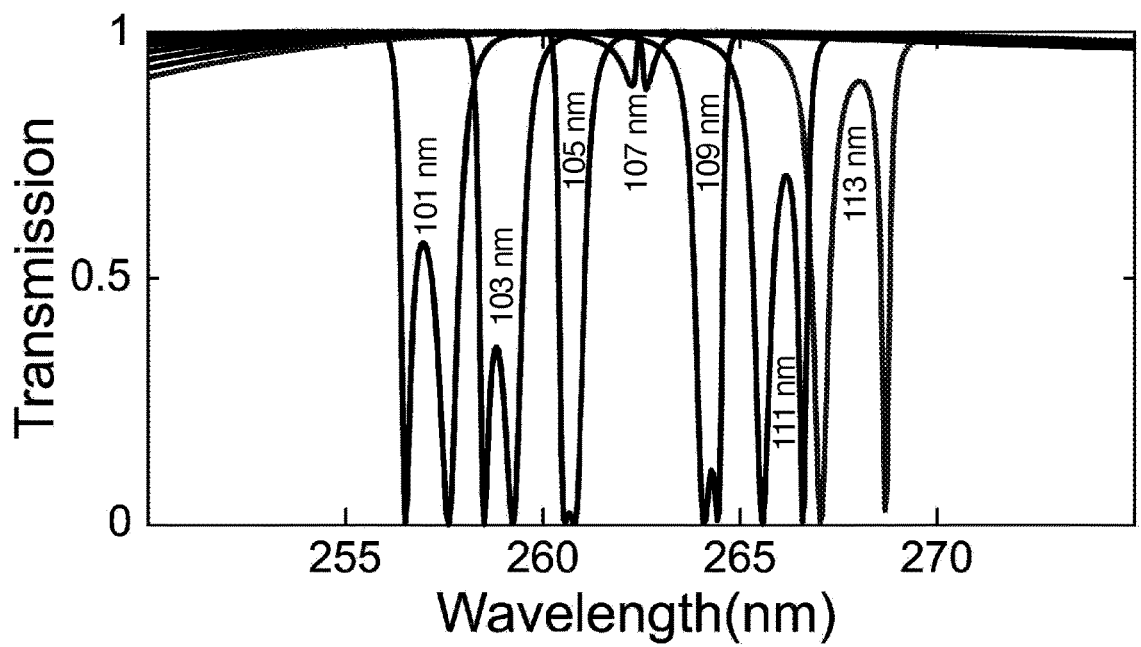
FIG. 3E is a graph of the transmission spectra of biperiodic diamond disk metasurfaces, according to an embodiment of the invention.

Similarly to symmetric disk metasurfaces, changing the disk aspect ratios shifts the resonant frequencies of the asymmetric dipole modes. Increasing the aspect ratio of both disks in a biperiodic lattice while maintaining a constant α causes the high Q electric and magnetic dipoles to shift in relation to each other. FIG. 3E is a graph of the transmission spectra of biperiodic diamond disk metasurfaces with lattice parameter α=200 nm, height h=60 nm, asymmetry parameter α=0.1, and center diameter varying from d=101 nm to d=113 nm. Increasing the disk diameter creates a larger frequency shift in $p_\alpha$ than $m_\alpha$ and leads to a spectral overlap of the two modes when d=107 nm. At this condition, we see unity transmission as backscattering is suppressed in a Kerker-like condition involving high Q dipolar resonances.

Tailoring C with the asymmetric dipolar modes $p_\alpha$ and $m_\alpha$ is analogous to the results shown in FIG. 2A-2I utilizing symmetric dipolar modes p and m. The local maximum C enhancements external to the disks are calculated for the biperiodic metasurfaces as the diameter is varied. FIG. 4A shows the maximum local optical chirality for high Q disk metasurfaces (α=0.1) with h=60 nm and diameters d=101 nm to d=113 nm. The optical chirality density is most strongly enhanced when the modes are spectrally overlapped for a metasurface with d=107 nm and reach a peak value enhancement of more than 1100-fold. Furthermore, the spatial distribution of the phase difference between the electric and magnetic fields when the modes are overlapped shows that the incident polarization of the LCP wave is largely preserved in the scattered field and $\cos(\phi)$ is negative in sign for all space. FIG. 4B shows the spatial distribution of the phase between E and H, $\cos(\phi)$, for a metasurface with d=107 nm.

Figure 4D:
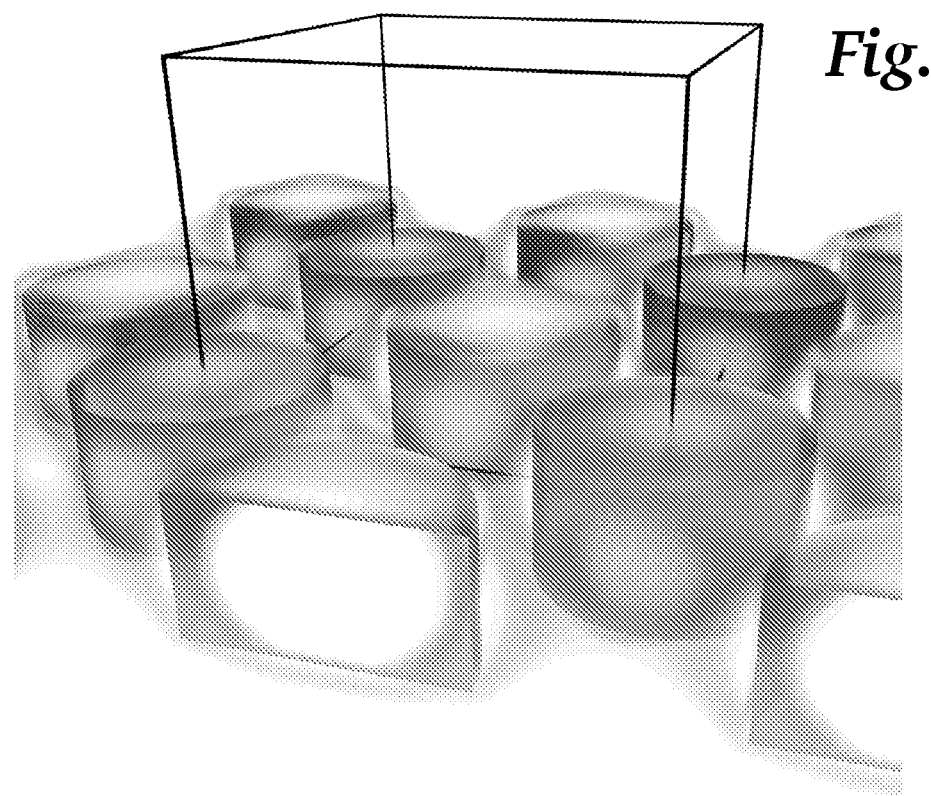
FIG. 4D is a schematic diagram showing three-dimensional rendering of the near field optical chirality enhancements in an asymmetric disk metasurface, according to an embodiment of the invention.
Figure 4E:
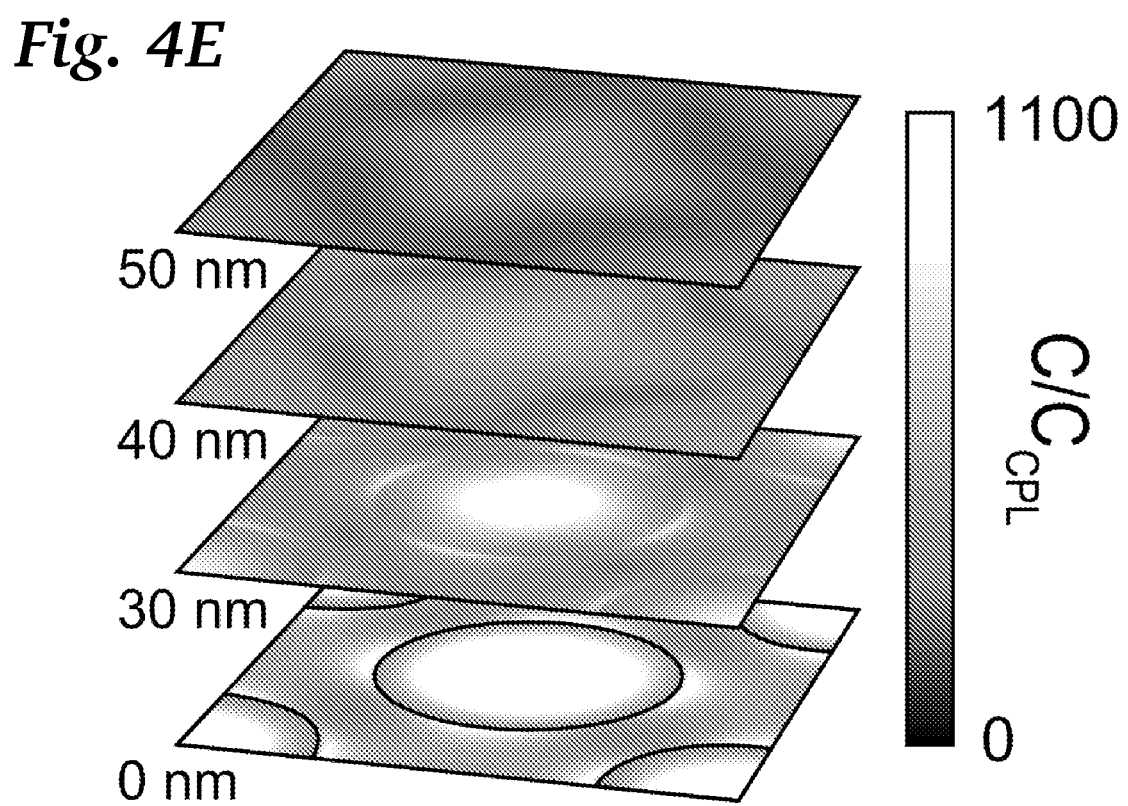
FIG. 4E is a plot showing the near field optical chirality enhancements in x-y cut planes at various z heights, according to an embodiment of the invention.

Since the circular polarization state of the incident wave is largely maintained, C is increased for a single handedness and enhancements persist throughout the near field of the metasurface. FIG. 4C is a plot of the logarithmic scaled distribution of C for a metasurface with d=107 nm. The spatial distribution of C in FIG. 4C shows that C is most highly concentrated inside the diamond nanodisks where the electromagnetic field intensities of the dipolar modes are strongest and decay away from the surface of the disks. FIG. 4D and FIG. 4E are schematic diagrams showing three-dimensional rendering of the near field optical chirality enhancements in an asymmetric disk metasurface (α=0.1, d=107 nm) and x-y cut planes at various z heights in a single unit cell. The cut planes are along different z heights (z=0 describes the plane that intersects the center of the disks). In all planes, C enhancements are of a single handedness. The largest values of C are located at hotspots on the top surface of the disks (z=30 nm) and along four lobes around the radial face of the disks (z=0 nm) where enhancements of more than 1000-fold are observed. Additionally, large values of $C/C_{CPL}$ persist in the space between nanostructures with a minimum of ~230.

Figure 4F:
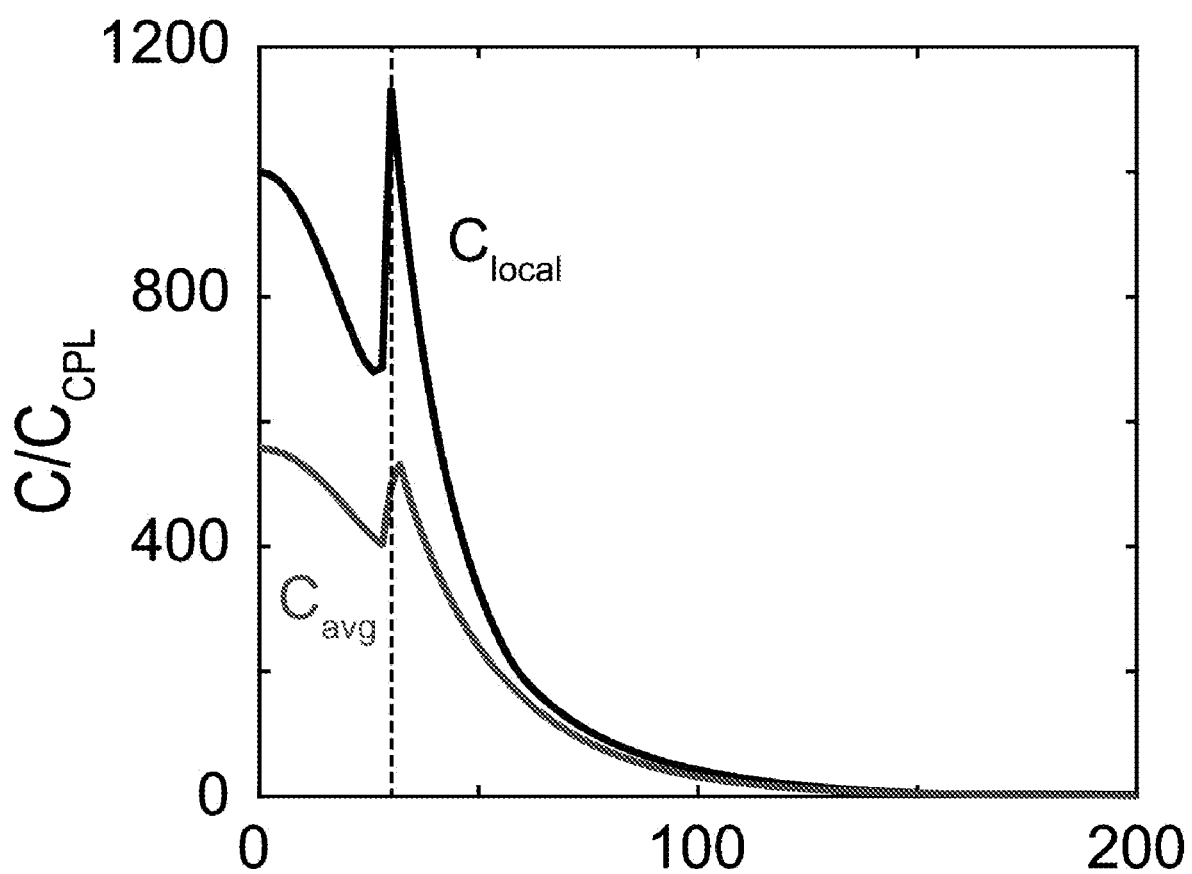
FIG. 4F is a graph showing z height dependence of local ($C_{local}$) and plane averaged ($C_{ave}$) optical chirality enhancements, according to an embodiment of the invention.

To quantify the large enantiospecific enhancements seen in the volume surrounding the metasurface, we consider local and averaged optical chirality across various z slices. FIG. 4F is a graph showing z height dependence of local ($C_{local}$) and plane averaged ($C_{ave}$) optical chirality enhancements. The dashed line marks the top surface of the disks at z=30 nm. The $C_{local}$ curve plots the maximum value of the local optical chirality enhancement along a particular z height. We see at z=0 nm, the plane that cuts through the center of the disk array, the maximum value of $C/C_{CPL}$ external to the disks is 1000 and enhancements decline until z=30 nm at the top surface of the disks where $C/C_{CPL}$=1130. From z=30 nm, enhancements decay exponentially away from the surface of the disk array. This trend is identical in both the +z and −z direction as the C enhancements are mirror symmetric about the z=0 nm plane. The optical chirality enhancement external to the disks averaged across a plane is considered in the $C_{ave}$ curve. We see that when C enhancements are considered in all the space between disks (z=0 nm to z=30 nm) the average optical chirality density exceeds 400-fold. Even above the metasurface, the average C increase across a plane is greater than 100-fold until z=70 nm. This result illustrates the advantage of utilizing spectrally and spatially aligned electric and magnetic dipole resonances to concentrate the electromagnetic fields while maintaining a single handedness of polarization in the scattered fields. When $p_\alpha$ and $m_\alpha$ are detuned, the individual resonances still produce large local concentrations of C, but of opposite signs, leading to minimal averaged enhancements (Supporting Information). Even when the background refractive index is increased to n=1.5 in order to represent a substrate and superstrate, the high Q modes $p_\alpha$ and $m_\alpha$ are still present and $C/C_{CPL} \geq 1000$ can be achieved.

Finally, we note that our biperiodic diamond lattice can be tailored to increase Kuhn's dissymmetry factor, g, for enantiospecific photolysis or photosynthesis of chiral molecules. This factor describes the efficiency with which a chiral molecule absorbs RCP versus LCP. Our diamond metasurfaces can enhance g locally by 35 fold compared to CPL. Assuming first order kinetics, this enhancement can impact the asymmetric photodecomposition of an azidoamide molecule (g=0.024), producing a solution with a 10% enantiomeric excess at a product yield of 79% compared to 0.02% with no metasurface.

Figure 5A:
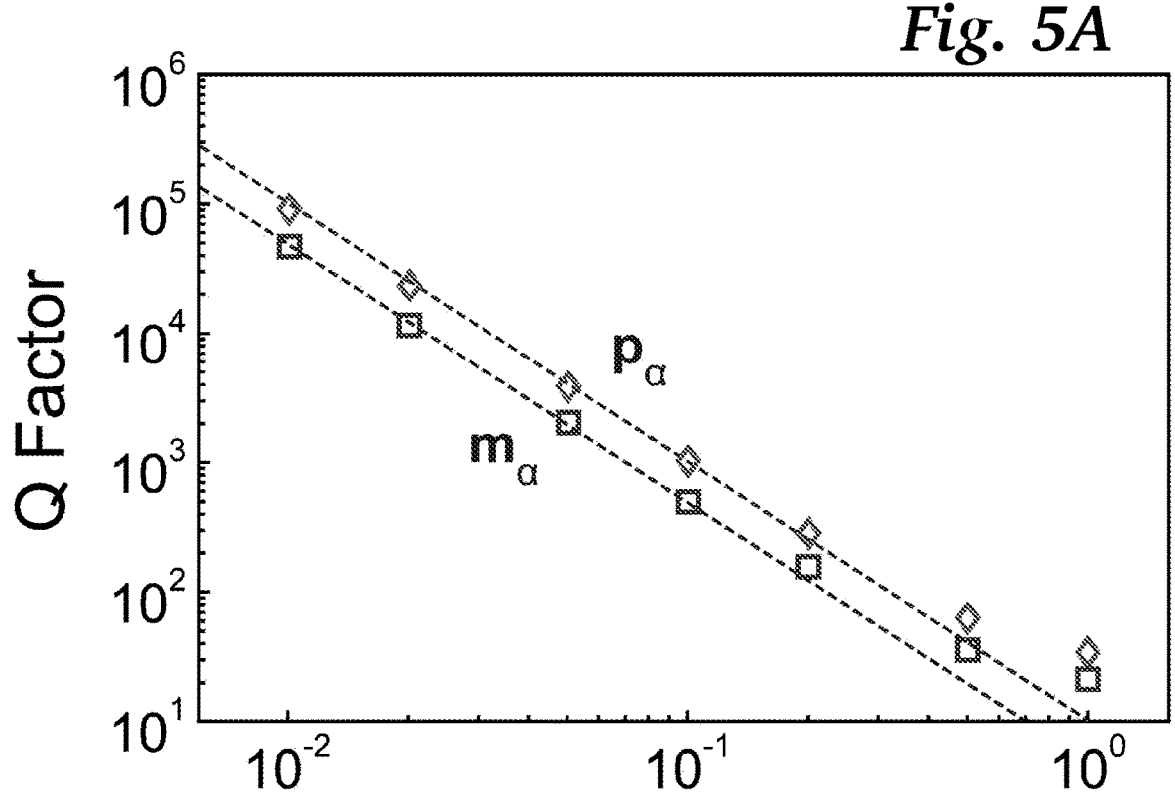
FIG. 5A is a graph of the quality factors of the asymmetric electric $p_\alpha$ and magnetic $m_\alpha$ dipole resonances with varying asymmetry parameter, according to an embodiment of the invention.
Figure 5B:
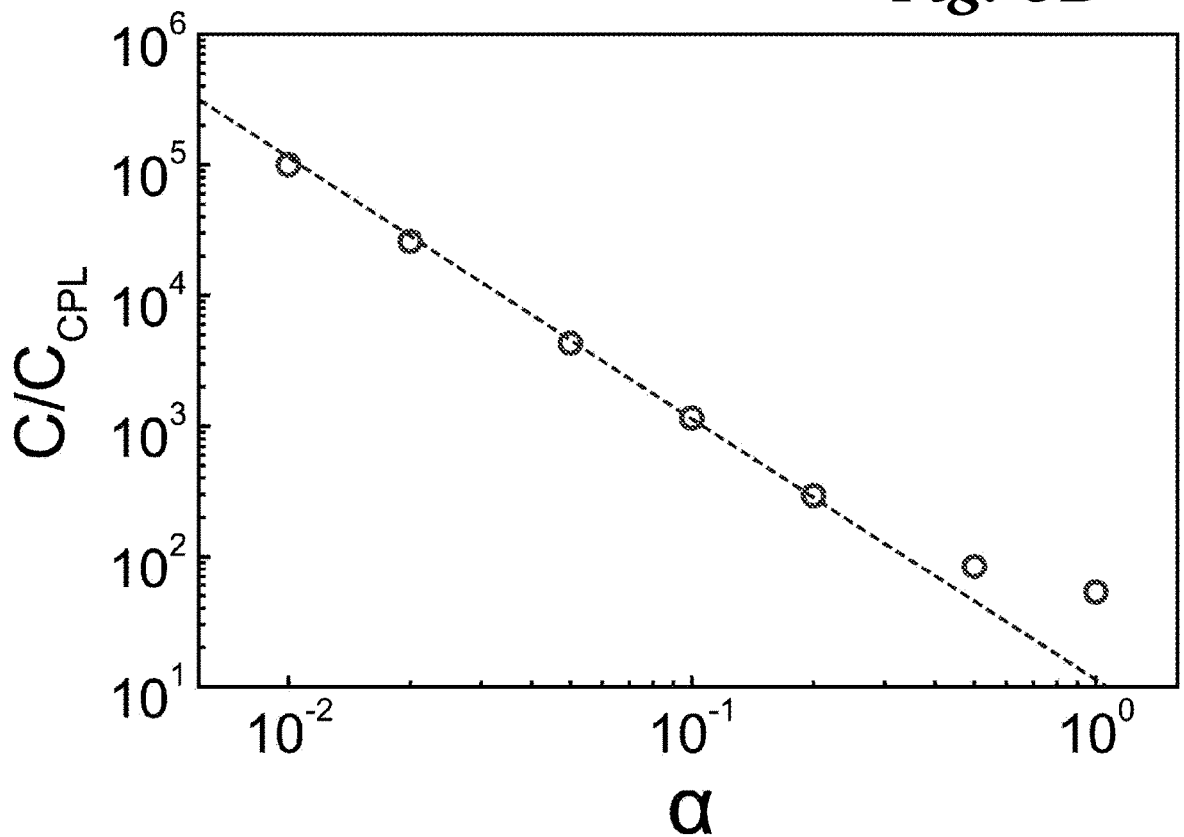
FIG. 5B is a graph of maximum local optical chirality enhancements in diamond biperiodic metasurfaces with varying asymmetry parameters, according to an embodiment of the invention.

While we have shown that large C enhancements can be achieved in metasurfaces with a fixed α=0.1, the structural asymmetry can be used as an additional tuning parameter to control the resonant lifetimes of the asymmetric electric and magnetic dipole resonances. FIG. 5A is a graph of the quality factors of the asymmetric electric $p_\alpha$ and magnetic $m_\alpha$ dipole resonances with varying asymmetry parameter. The Q factor of $p_\alpha$ and $m_\alpha$ increase as the diameter offset between neighboring disks is decreased. The dependence of the Q factor on small structural deviations, such as α, has been previously described in metasurfaces through temporal coupled-mode theory and perturbation theory:

$$Q = b/\alpha^2,$$

where B is a constant that depends on the metasurface design. This relationship is only valid for small structural perturbations and we see the trend for the Q factor deviating when a is greater than 0.1. If we vary α and spectrally align the $p_\alpha$ and $m_\alpha$ modes, we also see a similar trend in the maximum local C enhancements. FIG. 5B is a graph of maximum local optical chirality enhancements in diamond biperiodic metasurfaces with varying asymmetry parameters. The dashed lines represent functions of the form $B/\alpha^2$, where B is a constant. Tuning the quality factor of the resonant modes in the metasurface allows us to achieve optical chirality enhancements multiple orders of magnitude larger than previously reported nanophotonic sensors as shown in FIG. 1. In practical applications, spectral alignment of high Q resonant modes through geometric tuning will be difficult due to fabrication imperfections. However, resonance frequencies could be further adjusted with gas condensation, temperature control, or electrical tuning methods.

In conclusion, embodiments of the invention provide metasurface devices that strongly enhance the optical chirality, C, in the mid-ultraviolet wavelength regime. The devices utilize dielectric disks, where electric and magnetic dipole resonances can be tuned in relation to each other through the disk aspect ratio. To increase electromagnetic field intensities in the metasurface, we exploit resonances with higher quality factors. We design a biperiodic disk metasurface, where a geometric asymmetry is introduced in the form of a diameter offset in adjacent nanoantennas. This structural perturbation allows for coupling to high Q asymmetric electric and magnetic dipole resonances. We find that the spectral overlap of these modes produces a Kerker effect that resonantly enhances the near fields while maintaining the polarization of the incident CPL, a condition ideally suited for maximizing $C/C_{CPL}$. When the difference in diameters of the adjacent disks in our biperiodic lattice is 10%, the local C enhancement exceeds 1000-fold and plane averaged C enhancements 40 nm away from the metasurface exceed 100-fold. We also show that tuning the degree of asymmetry in a biperiodic lattice can produce resonant Q factors and C enhancements spanning multiple orders of magnitude. These enhancements occur for wavelengths between 200-300 nm where most chiral small molecules exhibit CD peaks. However, this high Q platform can also be scaled to operate at longer wavelengths for other spectroscopies such as vibrational circular dichroism. Additionally, this design features highly spectrally selective C enhancements that could be utilized in a pixelated metasurface for molecular chirality barcoding. The ability to control the resonant quality factors and increase optical chirality densities in metasurfaces has the potential for highly sensitive chiroptical spectroscopy as well as efficient enantiomer separation.

The devices may be fabricated on a dielectric substrate using lithography techniques to transfer a pattern to the materials. The substrate may be, for example, diamond, aluminum nitride, titanium dioxide, hafnium dioxide, zirconium dioxide, silicon nitride, or boron nitride. The device geometry will be defined using either photolithography, electron beam lithography, or nanoimprint lithography. Then, reactive ion etching or material deposition methods such as atomic layer deposition (ALD) or chemical vapor deposition (CVD) can be used to transfer the pattern to a suitable dielectric material.

The invention claimed is:

1. A device for detecting optical chirality, the device comprising a metasurface composed of a biperiodic array of nanodisks,
   wherein the nanodisks are composed of a dielectric material that is transparent and has a refractive index greater than 2 at a predetermined operational ultraviolet wavelength between 200-300 nm;
   wherein the nanodisks have a width-to-height ratio tuned to produce spectral overlap of electric dipole and magnetic dipole modes of incident circularly polarized ultraviolet light;
   wherein the biperiodic array is a checkerboard array, where the nanodisks have diameters $d \pm \Delta/2$ such that adjacent nanodisks have diameters that differ by an offset $\Delta$.

2. The device of claim 1 wherein an asymmetry parameter $\alpha = \Delta/d$ is substantially 0.1 or less.

3. The device of claim 1 wherein the dielectric material has a bandgap larger than 3 eV.

4. The device of claim 1 wherein the dielectric material is diamond, titanium dioxide, aluminum nitride, hafnium oxide, boron nitride, zirconium dioxide, or silicon nitride.

5. The device of claim 1 wherein a height of the nanodisks is 50-200 nm.

6. The device of claim 1 wherein a spacing between adjacent nanodisks is 100-400 nm.

7. The device of claim 1 wherein the width-to-height aspect ratio of the nanodisks is 0.3-3.0.

* * * * *